United States Patent
Asai

(10) Patent No.: US 10,340,540 B2
(45) Date of Patent: Jul. 2, 2019

(54) FUEL CELL SYSTEM AND METHOD THEREOF

(71) Applicant: NISSAN MOTOR CO., LTD., Yokohama-shi, Kanagawa (JP)

(72) Inventor: Yoshitomo Asai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 253 days.

(21) Appl. No.: 15/522,435

(22) PCT Filed: Sep. 17, 2015

(86) PCT No.: PCT/JP2015/076552
§ 371 (c)(1),
(2) Date: Apr. 27, 2017

(87) PCT Pub. No.: WO2016/067788
PCT Pub. Date: May 6, 2016

(65) Prior Publication Data
US 2018/0294497 A1  Oct. 11, 2018

(30) Foreign Application Priority Data

Oct. 28, 2014 (JP) .................................. 2014-219710

(51) Int. Cl.
| H01M 8/04 | (2016.01) |
| H01M 8/04791 | (2016.01) |
| H01M 8/0438 | (2016.01) |
| H01M 8/04119 | (2016.01) |
| H01M 8/0444 | (2016.01) |

(Continued)

(52) U.S. Cl.
CPC ......... *H01M 8/04798* (2013.01); *H01M 8/04* (2013.01); *H01M 8/04179* (2013.01); *H01M 8/04201* (2013.01); *H01M 8/04231* (2013.01); *H01M 8/04388* (2013.01); *H01M 8/04447* (2013.01)

(58) Field of Classification Search
CPC ......... H01M 8/04798; H01M 8/04231; H01M 8/04201; H01M 8/04388; H01M 8/04179; H01M 8/04447; H01M 8/04
See application file for complete search history.

(56) References Cited

U.S. PATENT DOCUMENTS

| 8,211,579 B2 * | 7/2012 | Igarashi ............ H01M 8/04022 429/429 |
| 2006/0121326 A1 | 6/2006 | Hiramatsu et al. |
| 2008/0008921 A1 | 1/2008 | Miura |

(Continued)

FOREIGN PATENT DOCUMENTS

| JP | 2005-203143 | 7/2005 |
| JP | 2006-164562 A | 6/2006 |
| WO | WO 2013/129453 A1 | 9/2013 |

*Primary Examiner* — Stewart A Fraser
(74) *Attorney, Agent, or Firm* — Foley & Lardner LLP

(57) ABSTRACT

A fuel cell system comprising: a supply valve for supplying the anode gas into an anode system of the fuel cell system; a purge valve for discharging an off-gas from the anode system; a pressure detecting portion that estimates or measures a pressure inside the anode system; and a hydrogen concentration estimating portion that estimates a hydrogen concentration inside the anode system based on a pressure decrease during a purge valve open duration in a supply valve close state.

11 Claims, 17 Drawing Sheets

(51) Int. Cl.
*H01M 8/04082* (2016.01)
*H01M 8/04223* (2016.01)

(56) References Cited

U.S. PATENT DOCUMENTS

| | | | |
|---|---|---|---|
| 2012/0038373 A1* | 2/2012 | Ikeda | H01M 8/04641 |
| | | | 324/691 |
| 2012/0156575 A1 | 6/2012 | Di Fiore et al. | |
| 2013/0137007 A1* | 5/2013 | Lee | H01M 8/0447 |
| | | | 429/444 |
| 2015/0017562 A1 | 1/2015 | Ichikawa et al. | |
| 2017/0331129 A1* | 11/2017 | Asai | H01M 8/04 |
| 2017/0373334 A1* | 12/2017 | Asai | H01M 8/04402 |

\* cited by examiner

FUEL CELL SYSTEM AND METHOD THEREOF

TECHNICAL FIELD

This invention relates to a fuel cell system.

BACKGROUND ART

In the prior art, there is known a fuel cell system, in which a gas amount discharged from the anode system is computed based on a pressure change inside the anode system in the downstream from the hydrogen supply valve while a supply of hydrogen to the fuel cell stops by closing the hydrogen supply valve (US 2012/0,156,575 A).

SUMMARY OF INVENTION

While the purge valve is closed during the operation of the fuel cell system, nitrogen and the like transmitted from the cathode of the fuel cell to the anode through an electrolytic membrane are accumulated in the anode system, so that the hydrogen concentration inside the anode system gradually decreases. As the hydrogen concentration inside the anode system decreases, a voltage drop may occur during the operation of the fuel cell system.

In order to prevent such a voltage drop, the off-gas containing nitrogen or hydrogen is discharged from the inside of the anode system through the purge valve by opening the purge valve as necessary, so that the hydrogen concentration inside the anode system is maintained such that the voltage drop does not occur. However, since there was no method of estimating the hydrogen concentration inside the anode system with high accuracy, it was difficult to appropriately control the amount of the off-gas (purging amount) discharged from the inside of the anode system through the purge valve. In addition, the purging amount was excessive more than the necessary amount, so that fuel efficiency was degraded. Reversely, the purging amount was insufficient, so that a voltage drop may occur.

In view of such problems, this invention has been made to estimate the hydrogen concentration inside the anode system with high accuracy.

According to an aspect of this invention, there is provided a fuel cell system having a fuel cell supplied with an anode gas and a cathode gas to generate electricity from the fuel cell depending on a load. The fuel cell system comprises a supply valve for supplying the anode gas into an anode system of the fuel cell system, a purge valve for discharging the off-gas from the anode system, a pressure detecting portion that estimates or measures the pressure inside the anode system, and a hydrogen concentration estimating portion that estimates the hydrogen concentration inside the anode system based on a pressure decrease during the purge valve open duration in the supply valve close state.

DESCRIPTION OF EMBODIMENTS

Hereinafter, each embodiment of this invention will be described with reference to the accompanying drawings.

First Embodiment

In a fuel cell, electricity is generated by interposing an electrolytic membrane between an anode (fuel electrode) and a cathode (oxidant electrode) and supplying an anode gas (fuel gas) containing hydrogen to the anode and a cathode gas (oxidant gas) containing oxygen to the cathode. Electrode reactions generated in both the anode and the cathode are expressed as follows.

anode: $2H_2 \rightarrow 4H^+ + 4e^-$     (1)

cathode: $4H^+ + 4e^- + O_2 \rightarrow 2H_2O$     (2)

Through the electrode reactions (1) and (2), the fuel cell generates an electromotive force of approximately 1 V.

In order to use such a fuel cell as a power source of a vehicle, a fuel cell stack obtained by stacking several hundreds of fuel cells is employed because high electric power is necessary. In addition, a fuel cell system is provided to supply the anode gas and the cathode gas to the fuel cell stack, so that electric power for driving a vehicle is extracted.

Figure 1:
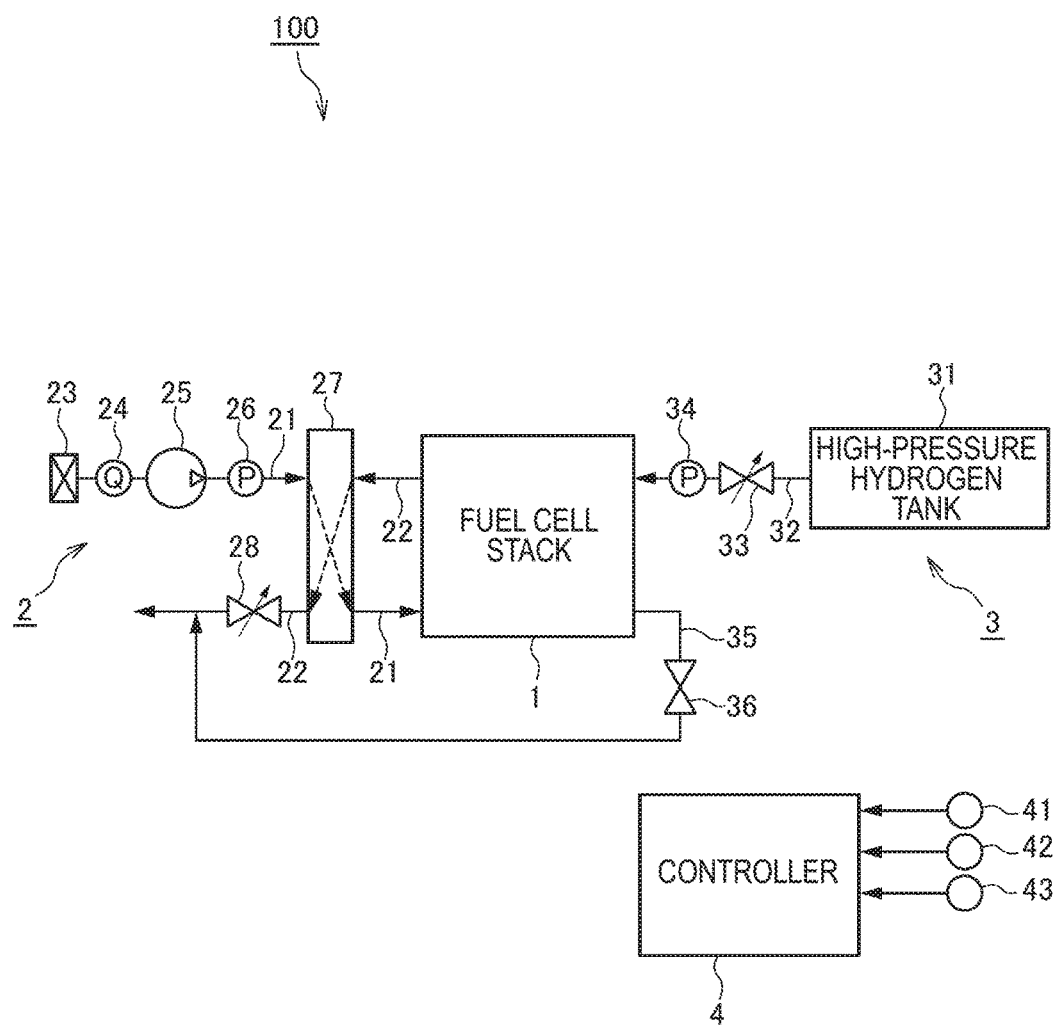
FIG. 1 is a schematic configuration diagram illustrating a fuel cell system according to a first embodiment of this invention.

FIG. 1 is a schematic configuration diagram illustrating a fuel cell system 100 according to a first embodiment of this invention.

The fuel cell system 100 comprises a fuel cell stack 1, a cathode gas supply/discharge unit 2, an anode gas supply/discharge unit 3, and a controller 4.

The fuel cell stack 1 is obtained by stacking a plurality of fuel cells. The fuel cell stack 1 is supplied with an anode gas and a cathode gas to generate electric power necessary to drive a vehicle.

The cathode gas supply/discharge unit 2 comprises a cathode gas supply passage 21, a cathode gas discharge passage 22, a filter 23, an air flow sensor 24, a cathode compressor 25, a cathode pressure sensor 26, a water recovery device (hereinafter, referred to as a "WRD") 27, and a cathode pressure control valve 28. The cathode gas supply/discharge unit 2 supplies the fuel cell stack 1 with the cathode gas and discharges the cathode off-gas discharged from the fuel cell stack 1 to the atmosphere.

The cathode gas supply passage 21 is a passage for flowing the cathode gas supplied to the fuel cell stack 1. One end of the cathode gas supply passage 21 is connected to the filter 23, and the other end is connected to the cathode gas inlet hole of the fuel cell stack 1.

The cathode gas discharge passage 22 is a passage for flowing the cathode off-gas discharged from the fuel cell stack 1. One end of the cathode gas discharge passage 22 is connected to the cathode gas outlet hole of the fuel cell stack 1, and the other end is opened. The cathode off-gas is a mixture gas between the cathode gas and water vapor generated through the electrode reactions.

The filter 23 is used to remove a foreign object out of the cathode gas input to the cathode gas supply passage 21.

The air flow sensor 24 is provided in the cathode gas supply passage 21 in the upstream from the cathode compressor 25. The air flow sensor 24 detects a flow rate of the cathode gas supplied to the cathode compressor 25 and supplied finally to the fuel cell stack 1.

The cathode compressor 25 is provided in the cathode gas supply passage 21. The cathode compressor 25 inputs the air (the atmospheric air) as a cathode gas to the cathode gas supply passage 21 through the filter 23 and supplies it to the fuel cell stack 1.

The cathode pressure sensor 26 is provided in the cathode gas supply passage 21 between the cathode compressor 25 and the WRD 27. The cathode pressure sensor 26 detects a pressure of the cathode gas supplied to the fuel cell stack 1 (hereinafter, referred to as a "cathode pressure").

The WRD 27 is connected to each of the cathode gas supply passage 21 and the cathode gas discharge passage 22 to recover moisture in the cathode off-gas flowing through the cathode gas discharge passage 22 and use the recovered moisture to humidify the cathode gas flowing through the cathode gas supply passage 21.

The cathode pressure control valve 28 is provided in the cathode gas discharge passage 22 in the downstream from the WRD 27. The open/close state of the cathode pressure control valve 28 is controlled by the controller 4 to control a pressure of the cathode gas supplied to the fuel cell stack 1. It is noted that, according to this embodiment, the cathode pressure is controlled to a desired pressure (target cathode pressure) basically by adjusting a rotation speed of the cathode compressor 25 and an opening level of the cathode pressure control valve 28.

The anode gas supply/discharge unit 3 supplies the fuel cell stack 1 with the anode gas and discharges the anode off-gas discharged from the fuel cell stack 1 into the cathode gas discharge passage 22. The anode gas supply/discharge unit 3 comprises a high-pressure hydrogen tank 31, an anode gas supply passage 32, a hydrogen supply valve 33, an anode pressure sensor 34, an anode gas discharge passage 35, and a purge valve 36.

The high-pressure hydrogen tank 31 maintains and stores the anode gas supplied to the fuel cell stack 1 in a high pressure state.

The anode gas supply passage 32 is a passage for supplying the anode gas discharged from the high-pressure hydrogen tank 31 to the fuel cell stack 1. One end of the anode gas supply passage 32 is connected to the high-pressure hydrogen tank 31, and the other end is connected to the anode gas inlet hole of the fuel cell stack 1.

The hydrogen supply valve 33 is provided in the anode gas supply passage 32. The open/close operation of the hydrogen supply valve 33 is controlled by the controller 4 to adjust a pressure of the anode gas supplied to the fuel cell stack 1 to a desired pressure. In addition, by controlling the open/close operation of the hydrogen supply valve 33, the flow rate of the anode gas supplied to the fuel cell stack 1 is also controlled.

The anode pressure sensor 34 is provided in the anode gas supply passage 32 in the downstream from the hydrogen supply valve 33. The anode pressure sensor 34 detects a pressure of the anode gas supply passage 32 in the downstream from the hydrogen supply valve 33. According to this embodiment, the pressure detected by the anode pressure sensor 34 is used as a pressure inside the anode system (hereinafter, referred to as an "anode pressure") from the hydrogen supply valve 33 to the purge valve 36.

The anode gas discharge passage 35 is a passage for flowing the anode off-gas discharged from the fuel cell stack 1. The anode off-gas is a mixture gas between the remaining hydrogen (anode gas) not used in the electrode reactions, and nitrogen or water vapor transmitted from the cathode side to the anode side through an electrolytic membrane. One end of the anode gas discharge passage 35 is connected to the anode gas outlet hole of the fuel cell stack 1, and the other end is connected to the cathode gas discharge passage 22.

The anode off-gas discharged to the cathode gas discharge passage 22 is mixed with the cathode off-gas in the cathode gas discharge passage 22 and is discharged to the outside of the fuel cell system 100. Since the anode off-gas contains the remaining hydrogen not used in the electrode reactions, the anode off-gas is mixed with the cathode off-gas and is discharged to the outside of the fuel cell system 100 to maintain a hydrogen concentration in the discharged gas at a predetermined concentration or lower.

The purge valve 36 is provided in the anode gas discharge passage 35. The open/close operation of the purge valve 36 is controlled by the controller 4 to control a flow rate of the anode off-gas (hereinafter, referred to as a "purge flow rate") discharged from the inside of the anode system to the cathode gas discharge passage 22.

The controller 4 is a microcomputer comprising a central processing unit (CPU), a read-only memory (ROM), a random access memory (RAM), and an input/output interface (I/O interface).

The controller 4 receives signals from various sensors for detecting an operation state of the fuel cell system 100, such as an accelerator stroke sensor 41 for detecting a depression level of an accelerator pedal (hereinafter, referred to as an "accelerator manipulation amount"), a temperature sensor 42 for detecting a temperature of the coolant (hereinafter, referred to as a "stack temperature") for cooling the fuel cell stack, and a current sensor 43 for detecting an output current of the fuel cell stack in addition to the air flow sensor 24 described above.

The controller 4 computes a target output current of the fuel cell stack 1 based on an operation state of the fuel cell system 100. Specifically, the controller 4 computes the target output current of the fuel cell stack 1 based on a request of power from a driving motor (not illustrated) for driving a vehicle, requests of power from accessories such as cathode compressor 25, and a charge/discharge request from a battery (not illustrated).

The controller 4 performs pulsating operation for increasing/decreasing the anode pressure periodically based on an operation state of the fuel cell system 100. In the pulsating operation, basically, the anode pressure is pulsated by periodically increasing or decreasing the anode pressure within a range of the pulsation upper limit pressure and the pulsation lower limit pressure set depending on the target output current of the fuel cell stack 1. By performing this pulsating operation, it is possible to obtain water drainability by discharging liquid water inside the anode system to the outside of the anode system when the anode pressure increases.

Here, during electricity generation of the fuel cell stack 1, nitrogen or water vapor is transmitted from the cathode side to the anode side through the electrolytic membrane. For this reason, if the purge valve 36 remains in a closed state, hydrogen is consumed in the fuel cell stack 1, and the transmitted nitrogen and the like are accumulated in the anode system. As a result, even when a pressure inside the anode system (anode pressure) is controlled to the same pressure, the hydrogen concentration inside the anode system gradually decreases as much as the transmitted nitrogen and the like. In this manner, if electricity is generated while the hydrogen concentration inside the anode system decreases, hydrogen necessary to generate electricity inside the fuel cell stack 1 becomes short, and a voltage drop may occur even when the anode pressure is controlled to a target value.

Meanwhile, when the purge valve 36 is opened, nitrogen and the like accumulated in the anode system are discharged from the inside of the anode system as an anode off-gas. Therefore, the hydrogen concentration inside the anode system increases (is recovered). That is, the hydrogen concentration inside the anode system changes depending on the amount of the anode off-gas (hereinafter, referred to as a "purging amount") discharged from the inside of the anode system through the purge valve 36. Specifically, as the purging amount increases, the hydrogen concentration inside the anode system increases.

However, as the purging amount increases, the hydrogen amount discharged as an anode off-gas from the inside of the anode system increases. This degrades fuel efficiency. Therefore, if the purging amount can be controlled depending on the hydrogen concentration inside the anode system, it is possible to sufficiently discharge nitrogen and the like as necessary while the hydrogen concentration inside the anode system is maintained at a level that does not generate a voltage drop (target hydrogen concentration: for example, 60%), and suppress degradation of the fuel efficiency to the minimum.

Here, it is necessary to estimate the hydrogen concentration inside the anode system in order to control the purging amount depending on the hydrogen concentration inside the anode system. In this regard, according to this embodiment, the hydrogen concentration inside the anode system is estimated using the following method.

Figure 2:
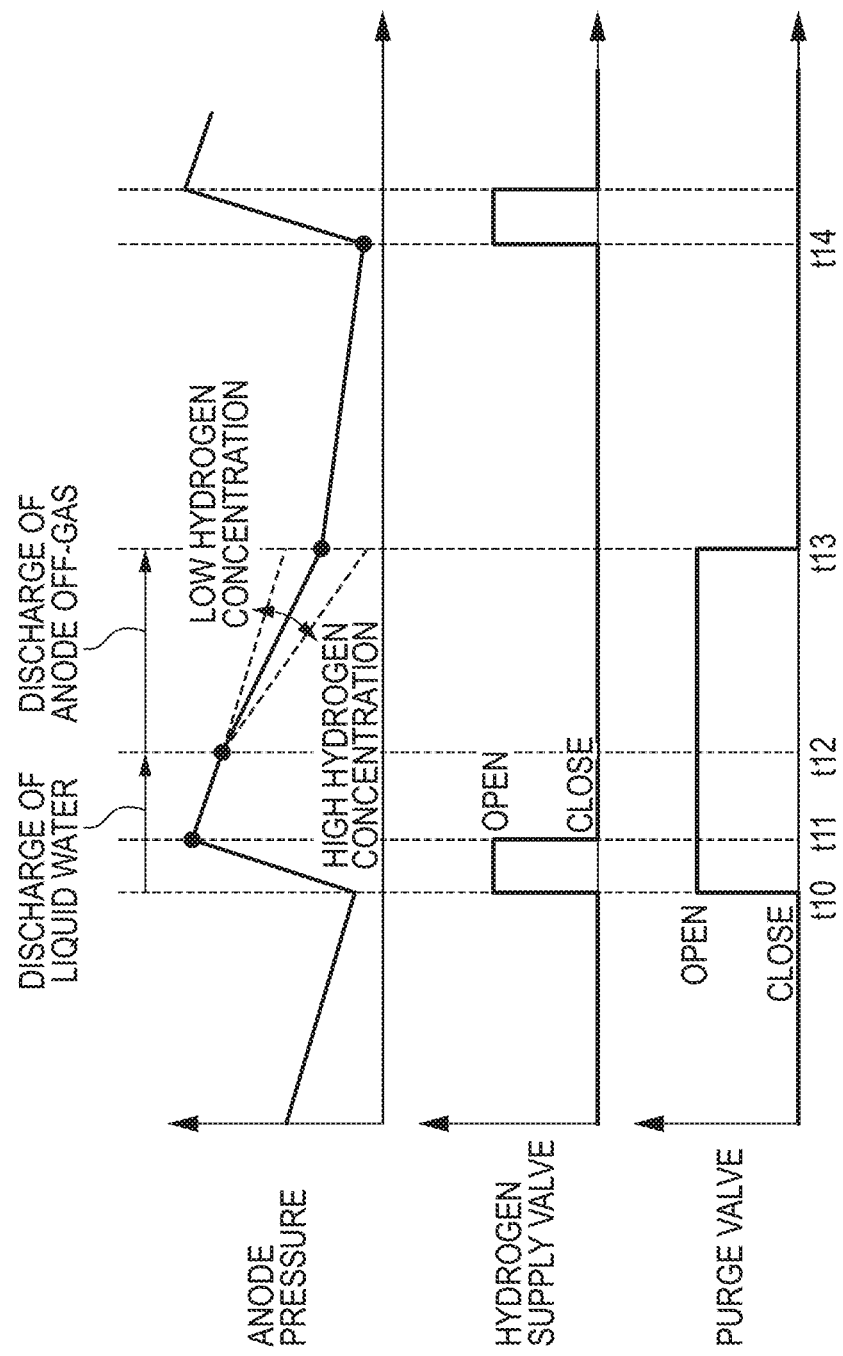
FIG. 2 is a diagram illustrating a method of estimating a hydrogen concentration inside an anode system according to the first embodiment of this invention.

FIG. 2 is a diagram illustrating the method of estimating the hydrogen concentration inside the anode system according to this embodiment.

According to this embodiment, the hydrogen concentration inside the anode system is estimated based on a pressure decrease during a purge valve 36 open duration in the hydrogen supply valve 33 close state.

As illustrated in FIG. 2, during electricity generation of the fuel cell stack 1, as the hydrogen supply valve 33 is closed at the timing t11, and the supply of the anode gas to the fuel cell stack 1 stops, the anode pressure gradually decreases. This change of the anode pressure is generated due to the following factors.

In FIG. 2, the purge valve 36 is opened from the timing t10 to the timing t13. However the purge valve 36 is closed from the timing t13 to the timing t14. However, the hydrogen inside the anode system consumed by generating electricity in the hydrogen supply valve 33 close state may be used as a factor of changing the anode pressure regardless of the open/close state of the purge valve 36. Since the purge valve 36 is closed from the timing t13 to the timing t14, the anode pressure decreases dominantly by the hydrogen consumed for electricity generation.

Meanwhile, since the purge valve 36 is opened from the timing t10 to the timing t13, the anode pressure decreases also by the gas (purge gas) flowing out through the purge valve 36 in addition to the hydrogen consumed for electricity generation from the timing t11 to the timing t13 after the hydrogen supply valve 33 is closed. It is noted that, since the liquid water is discharged as the purge valve 36 is opened, and the anode off-gas is then discharged as the purge gas due to the structure of the purge valve 36, the pressure decrease rate increases as the anode off-gas is discharged from the timing t12.

In this case, through inventor's diligent studies, it was revealed that the pressure decrease amount during the purge valve 36 open duration in the hydrogen supply valve 33 close state from the timing t11 to the timing t13 (strictly to say, from the timing t12 to the timing t13 after the liquid water is discharged) changes depending on the hydrogen concentration inside the anode system.

Since the molecular weight of hydrogen (molecular weight: 2) is very smaller than the molecular weight of nitrogen (molecular weight: 28), an average molecular weight of the anode off-gas inside the anode system decreases when the hydrogen concentration inside the anode system is high. When the purge valve 36 is opened, a molar flow rate (mol/ s) of the anode off-gas (purge gas) flowing out through the purge valve 36 increases as the average molecular weight decreases. Therefore, the flow rate of the purge gas increases as the hydrogen concentration inside the anode system increases.

That is, as illustrated in FIG. 2, as the hydrogen concentration inside the anode system increases, the pressure decrease amount of the anode pressure during the purge valve 36 open duration increases in the hydrogen supply valve 33 close state.

In this regard, according to this embodiment, the hydrogen concentration inside the anode system is estimated based on the pressure decrease during the purge valve 36 open duration in the hydrogen supply valve 33 close state. In addition, the purge valve is controlled based on the estimated hydrogen concentration inside the anode system.

Hereinafter, a purge control operation according to this embodiment will be described with reference to FIGS. 3 to 9.

Figure 3:
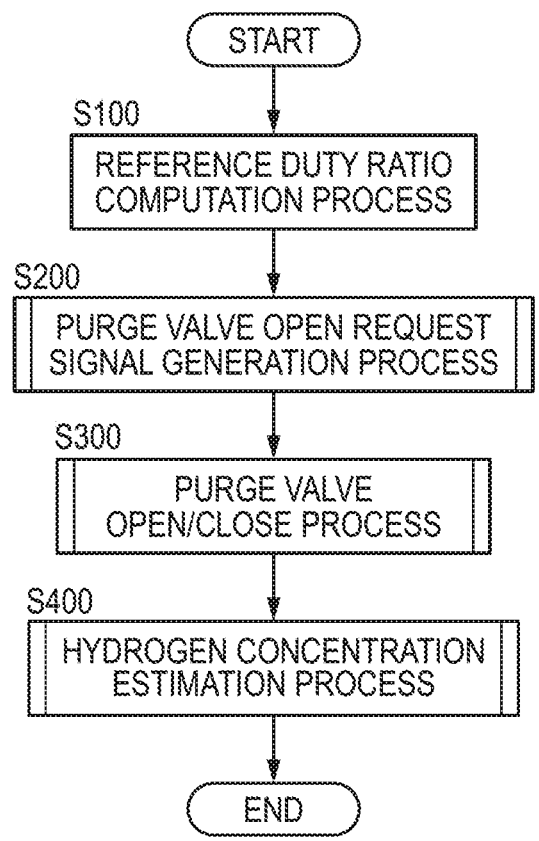
FIG. 3 is a flowchart illustrating a purge control operation according to the first embodiment of this invention.

FIG. 3 is a flowchart illustrating a purge control operation according to this embodiment. The controller 4 executes this routine repeatedly at a predetermined operation cycle.

In the step S100, the controller 4 performs a process of computing a duty ratio of the purge valve 36 serving as a reference (hereinafter, referred to as a "reference duty ratio")

for setting the hydrogen concentration inside the anode system to a predetermined target hydrogen concentration (for example, 60%). This reference duty ratio computation process will be described below in detail with reference to FIG. 4.

In the step S200, the controller 4 performs a process of generating a valve open request signal of the purge valve 36 based on the reference duty ratio. This purge valve open request signal generation process will be described below in detail with reference to FIG. 5.

In the step S300, the controller 4 performs a process of opening/closing the purge valve 36 in practice based on the purge valve open request signal and the like. This purge valve open/close process will be described below in detail with reference to FIG. 6.

In the step S400, the controller 4 performs a hydrogen concentration estimation process for estimating the hydrogen concentration inside the anode system based on the pressure decrease during the purge valve 36 open duration in the hydrogen supply valve 33 close state. This hydrogen concentration estimation process will be described in detail with reference to FIG. 9.

Figure 4:
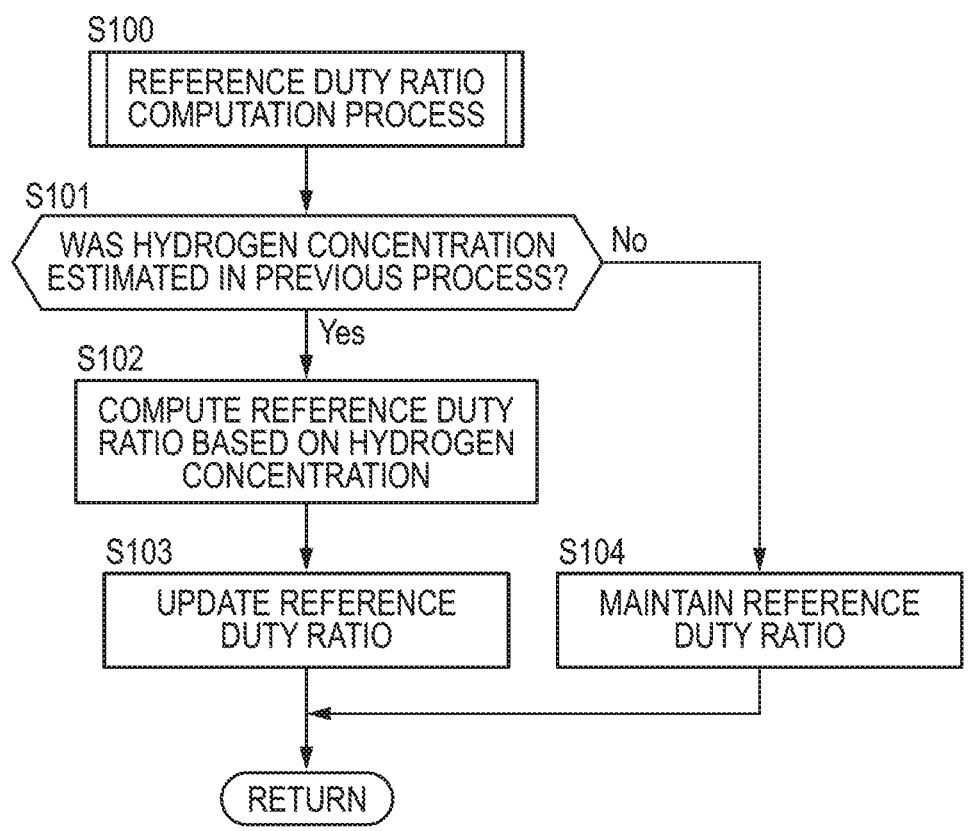
FIG. 4 is a flowchart illustrating a reference duty ratio computation process in detail.

FIG. 4 is a flowchart illustrating a reference duty ratio computation process in detail.

In the step S101, the controller 4 determines whether or not the hydrogen concentration inside the anode system is estimated through the previous process. If the hydrogen concentration is estimated through the previous process, the controller 4 processes the step S102. If the hydrogen concentration is not estimated, the controller processes the step S104.

In the step S102, the controller 4 computes the reference duty ratio based on the hydrogen concentration estimated through the previous process. Specifically, the controller performs a feedback control (PI control) based on a difference between the estimated hydrogen concentration and the target hydrogen concentration to compute the reference duty ratio. For this reason, as the estimated hydrogen concentration increases over the target hydrogen concentration, the reference duty ratio decreases. As the estimated hydrogen concentration decreases under the target hydrogen concentration, the reference duty ratio increases.

In the step S103, the controller 4 updates the reference duty ratio to reference duty ratio currently computed.

In the step S104, the controller 4 maintains the previous reference duty ratio as it is.

Figure 5:
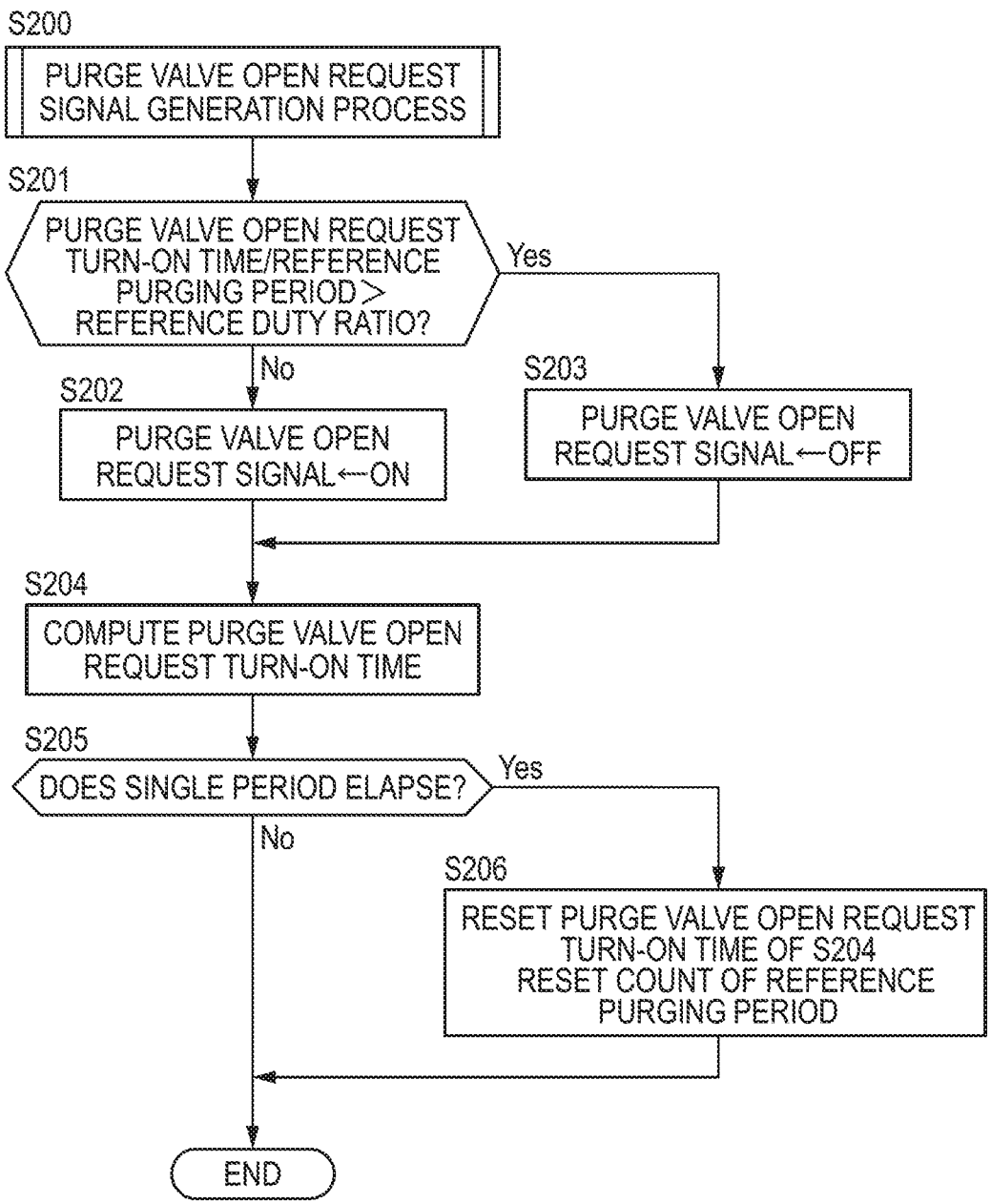
FIG. 5 is a flowchart illustrating a purge valve open request signal generation process in detail.

FIG. 5 is a flowchart illustrating a purge valve open request signal generation process in detail.

In the step S201, the controller 4 determines whether or not a value obtained by dividing an integrated time for which the purge valve open request signal described below is turned on (hereinafter, referred to as a "purge valve open request turn-on time") by a predetermined reference purging period (for example, 5 seconds) is greater than the reference duty ratio. That is, the controller 4 determines whether or not a proportion of the purge valve open request turn-on time occupied in the reference purging period is larger than the reference duty ratio. The controller 4 processes the step S203 if the division result is greater than the reference duty ratio. If the division result is equal to or smaller than the reference duty ratio, the controller 4 processes the step S202.

In the step S202, the controller 4 turns on the purge valve open request signal.

In the step S203, the controller 4 turns off the purge valve open request signal.

In the step S204, the controller 4 computes the purge valve open request turn-on time by integrating the time for which the purge valve open request signal is turned on.

In the step S205, the controller 4 determines whether or not a single reference purging period elapses. That is, for example, when the reference purging period is set to 5 seconds, it is determined whether or not 5 seconds elapse after the count of the reference purging period starts. If it is determined that a single reference purging period does not elapse, the controller 4 terminates this process. If it is determined that a single reference purging period elapses, the controller 4 processes the step S206.

In the step S206, the controller 4 resets the purge valve open request turn-on time computed in the step S204 to zero, and also resets the count of the reference purging period to zero.

Figure 6:
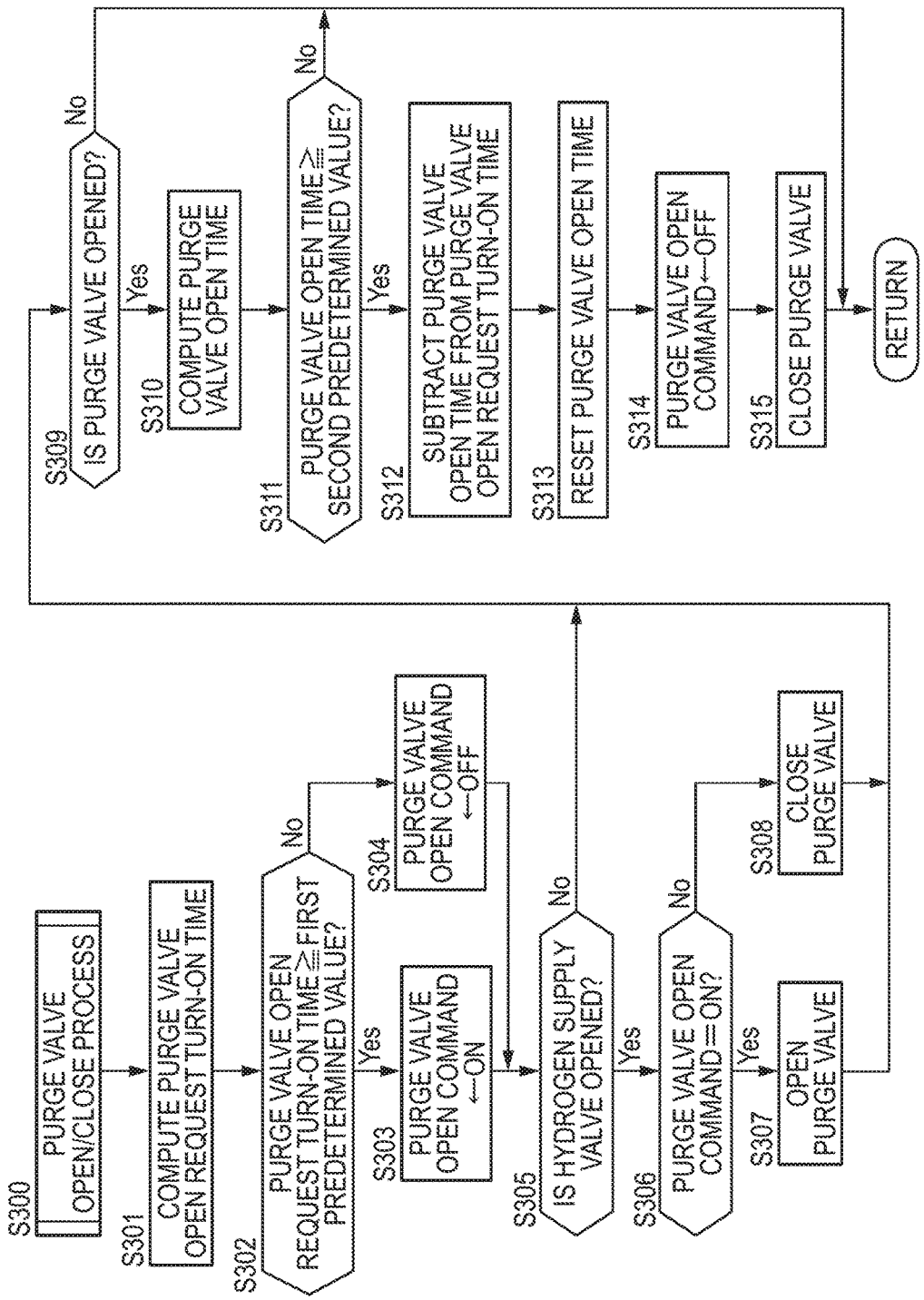
FIG. 6 is a flowchart illustrating a purge valve open/close process in detail.

FIG. 6 is a flowchart illustrating the purge valve open/close process in detail.

In the step S301, the controller 4 computes the purge valve open request turn-on time separately from the step S204 described above.

In the step S302, the controller 4 determines whether or not the purge valve open request turn-on time computed in the step S301 is equal to or longer than a first predetermined value set in advance. The controller 4 processes the step S303 if the purge valve open request turn-on time is equal to or longer than the first predetermined value. If the purge valve open request turn-on time is shorter than the first predetermined value, the controller 4 processes the step S304.

In the step S303, the controller 4 turns on the purge valve open command. The initial value of the purge valve open command is set to "OFF." As the hydrogen supply valve 33 is opened while the purge valve open command is turned on, the purge valve 36 is opened in practice.

In the step S304, the controller 4 turns off the purge valve open command.

In this manner, according to this embodiment, after the purge valve open request turn-on time (=integration value of the reference duty ratio) becomes equal to or longer than the first predetermined value, the purge valve open command is turned on, and the purge valve open operation is allowed. In this embodiment, this enables the anode off-gas to be reliably discharged through the purge valve 36 in the purge valve open state by guaranteeing a certain time for opening the purge valve 36 in the hydrogen supply valve 33 close state. In this manner, if the purge valve open command is turned on after the purge valve open request turn-on time (=integration value of the reference duty ratio) becomes equal to or longer than the first predetermined value, the reference duty ratio increases as the estimated hydrogen concentration decreases. Therefore, the interval for which the purge valve open command is turned on is reduced.

In the step S305, the controller 4 determines whether or not the hydrogen supply valve 33 is opened. If the hydrogen supply valve 33 is opened, that is, when the anode gas is supplied, the controller 4 processes the step S306. Otherwise, if the hydrogen supply valve 33 is closed, that is, when the anode gas supply stops, the controller 4 processes the step S309. This determination is performed in order to open the purge valve 36 as well as the hydrogen supply valve 33 in this embodiment.

In the step S306, the controller 4 determines whether or not the purge valve open command is turned on. The controller 4 processes the step S307 if the purge valve open command is turned on. If the purge valve open command is turned off, the controller 4 processes the step S308.

In the step S307, the controller 4 opens the purge valve 36.

In the step S308, the controller 4 closes the purge valve 36.

In the step S309, the controller 4 determines whether or not the purge valve 36 is opened. The controller 4 processes the step S310 if the purge valve 36 is opened. If the purge valve 36 is closed, the controller 4 terminates the process.

In the step S310, the controller 4 computes the purge valve open time by integrating the time for which the purge valve 36 is opened.

In the step S311, the controller 4 determines whether or not the purge valve open time computed in the step S310 is equal to or longer than a second predetermined value set in advance as a time for opening the purge valve 36 in practice. In this manner, according to this embodiment, the purge valve 36 is opened only for the second predetermined value if the purge valve open request turn-on time is equal to or longer than the first predetermined value. Although the first and second predetermined values are set to the same value in this embodiment, they may be set to different values. The first and second predetermined values may be obtained in advance through experiments and the like as a value (for example, 0.5 second) for which the hydrogen concentration inside the anode system can be maintained at the target hydrogen concentration, and the hydrogen concentration can be estimated with high accuracy. The controller 4 processes the step S312 if the purge valve open time is equal to or longer than the second predetermined value. If the purge valve open time is shorter than the second predetermined value, the controller 4 terminates the process.

In the step S312, the controller 4 subtracts the purge valve open time (=second predetermined value) from the purge valve open request turn-on time computed in the step S301.

In the step S313, the controller 4 resets the purge valve open time computed in the step S310 to zero.

In the step S314, the controller 4 turns off the purge valve open command.

In the step S315, the controller 4 closes the purge valve 36.

Figure 7:
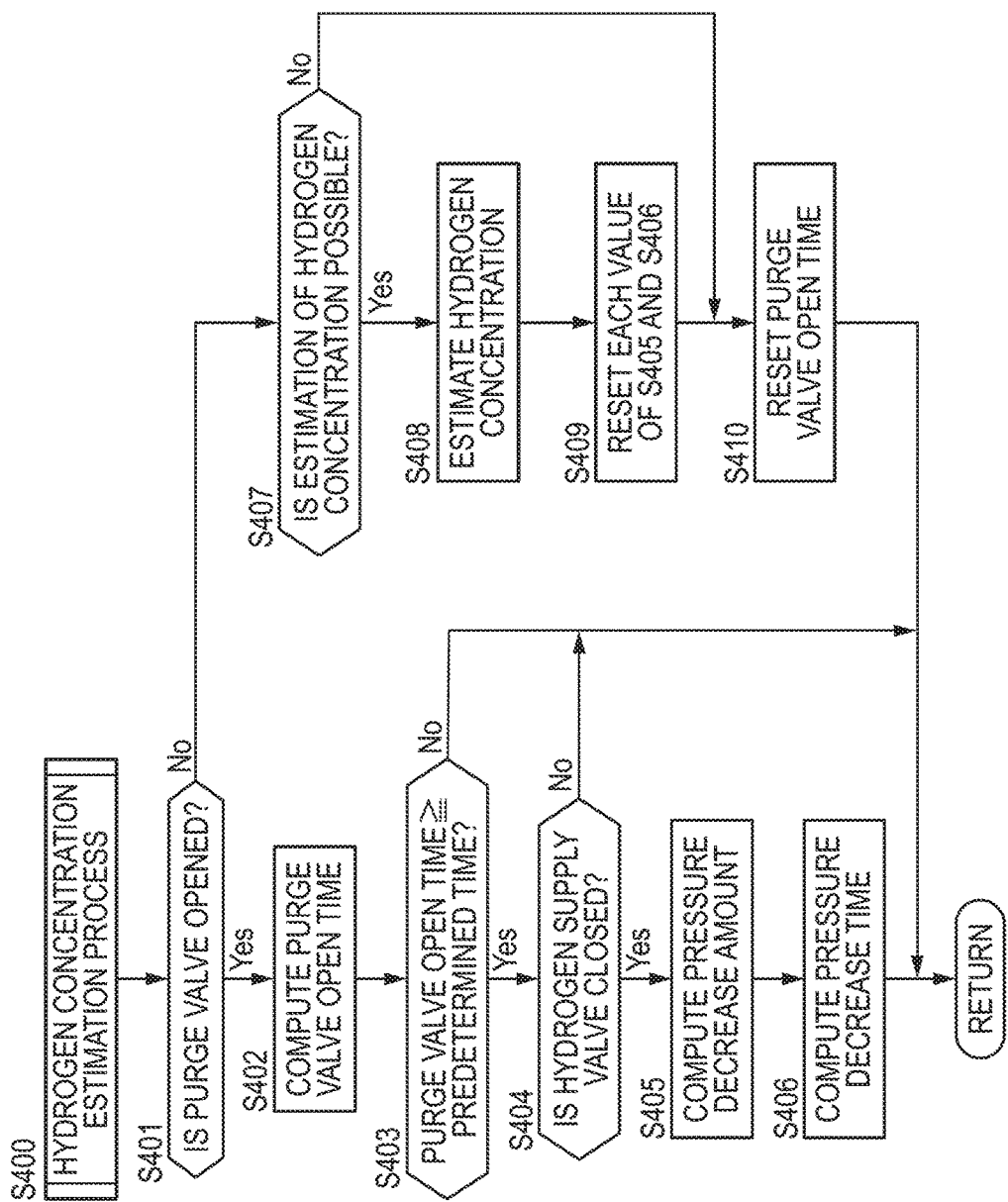
FIG. 7 is a flowchart illustrating a hydrogen concentration estimation process according to the first embodiment of this invention in detail.

FIG. 7 is a flowchart illustrating the hydrogen concentration estimation process in detail.

In the step S401, the controller 4 determines whether or not the purge valve 36 is opened. The controller 4 processes the step S402 if the purge valve 36 is opened. If the purge valve 36 is closed, the controller 4 processes the step S407.

In the step S402, the controller 4 integrates the time for which the purge valve 36 is opened to compute the purge valve open time separately from the step S310 described above.

In the step S403, the controller 4 processes the step S404 if the purge valve open time computed in the step S402 is equal to or longer than a predetermined time set in advance. If the purge valve open time is shorter than the predetermined time, the controller 4 terminates the process. This predetermined time is the time, set through experiments and the like, for which it can be determined that the liquid water inside the anode system is completely discharged, and the anode off-gas is discharged through the purge valve 36. Although this predetermined time is set to a fixed value in this embodiment, it may be set to change depending on a load because, for example, the amount of the liquid water inside the anode system increases as the load of the fuel cell stack 1 increases.

In the step S404, the controller 4 determines whether or not the hydrogen supply valve 33 is closed. The controller 4 processes the step S405 if the hydrogen supply valve 33 is closed. If the hydrogen supply valve 33 is opened, the controller 4 terminates the process.

In the step S405, the controller 4 computes the pressure decrease amount per operation cycle and adds this pressure decrease amount to the previous one to compute the pressure decrease amount during the purge valve 36 open duration in the hydrogen supply valve 33 close state after a predetermined time elapses as the purge valve open time.

In the step S406, the controller 4 computes the time necessary for the pressure decrease corresponding to the pressure decrease amount computed in the step S405 (hereinafter, referred to as a "pressure decrease time").

In the step S407, the controller 4 determines whether or not the hydrogen concentration can be estimated with high accuracy. Specifically, it is determined whether or not the pressure decrease amount computed in the step S405 is equal to or larger than a predetermined value, or whether or not the pressure decrease time computed in the step S406 is equal to or longer than a predetermined value. The controller 4 processes the step S408 if it is determined that the hydrogen concentration can be estimated with high accuracy. Otherwise, the controller 4 terminates the process.

Figure 8:
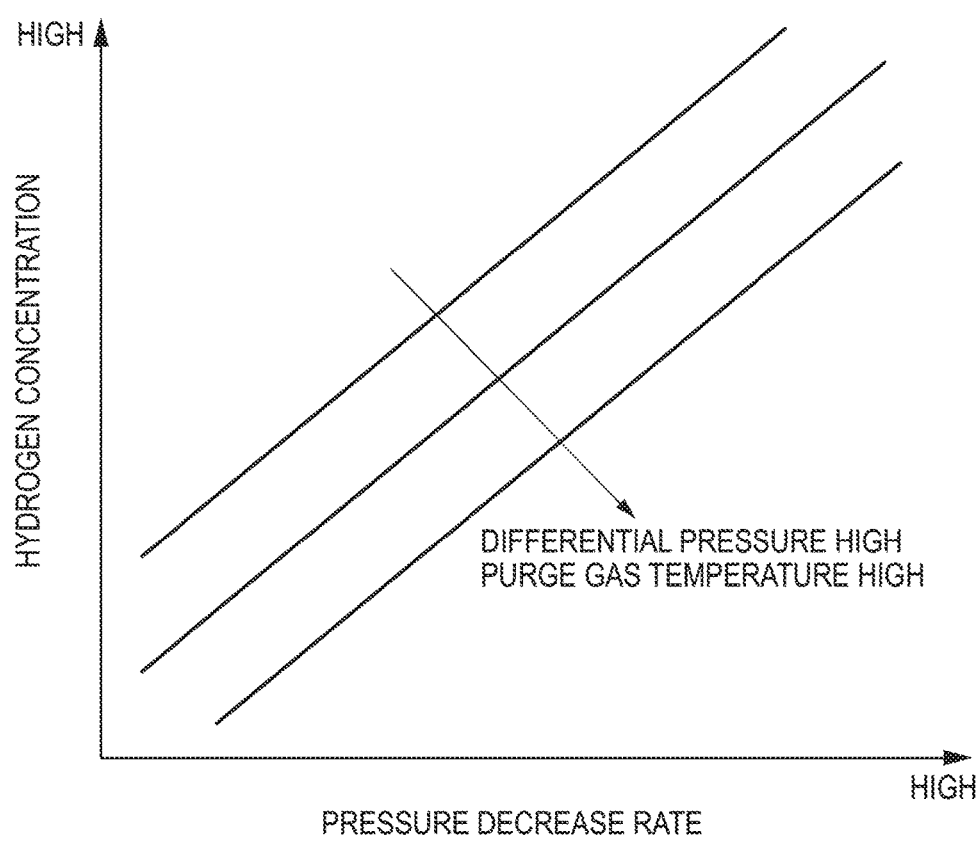
FIG. 8 is a map for estimating a hydrogen concentration based on a pressure decrease rate.

In the step S408, the controller 4 estimates the hydrogen concentration based on the pressure decrease rate obtained by dividing the pressure decrease amount by the pressure decrease time with reference to the map of FIG. 8. In the map of FIG. 8, the hydrogen concentration is corrected using a differential pressure of the purge valve 36 (=anode pressure−atmospheric pressure) and the temperature of the purge gas (anode off-gas). In this embodiment, the stack temperature is used as the temperature of the purge gas.

The hydrogen concentration is estimated to a lower value as the differential pressure of the purge valve 36 increases. This is because it can be estimated that the pressure decrease rate increases, and the purge flow rate increases as the differential pressure of the purge valve 36 increases. In addition, the hydrogen concentration is estimated to a lower value as the temperature of the purge gas increases. This is because it can be estimated that the saturation water vapor amount increases, the water vapor concentration out of the purge gas increases, and the hydrogen concentration out of the purge gas decreases accordingly as the temperature of the purge gas increases.

It is noted that the hydrogen concentration may be corrected based on the anode pressure and the atmospheric pressure instead of the differential pressure of the purge valve 36. Alternatively, instead of the temperature of the purge gas, by directly measuring the water vapor concentration using a sensor and the like or measuring and estimating a moisture state of the electrolytic membrane inside the fuel cell stack 1, for example, using an AC impedance method, and the hydrogen concentration may be corrected based on the measured or estimated water vapor concentration.

In the step S409, the controller 4 resets the pressure decrease amount and the pressure decrease time to zero as an initial value.

In the step S410, the controller 4 resets the purge valve open time computed in the step S402 to zero.

Figure 9:
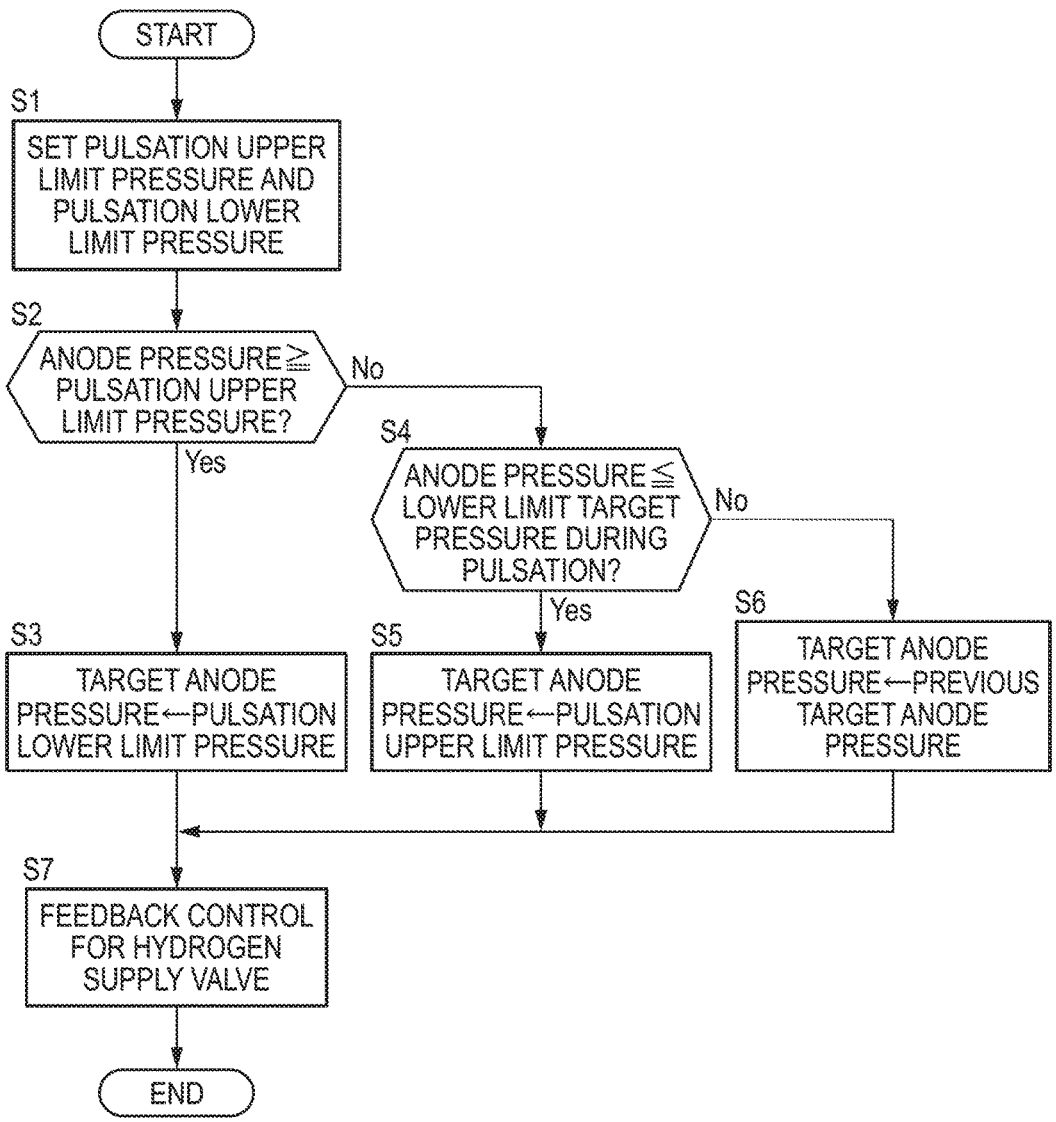
FIG. 9 is a flowchart illustrating a control of a hydrogen supply valve according to the first embodiment of this invention.

FIG. 9 is a flowchart illustrating a control of the hydrogen supply valve 33 according to this embodiment.

Figure 10:
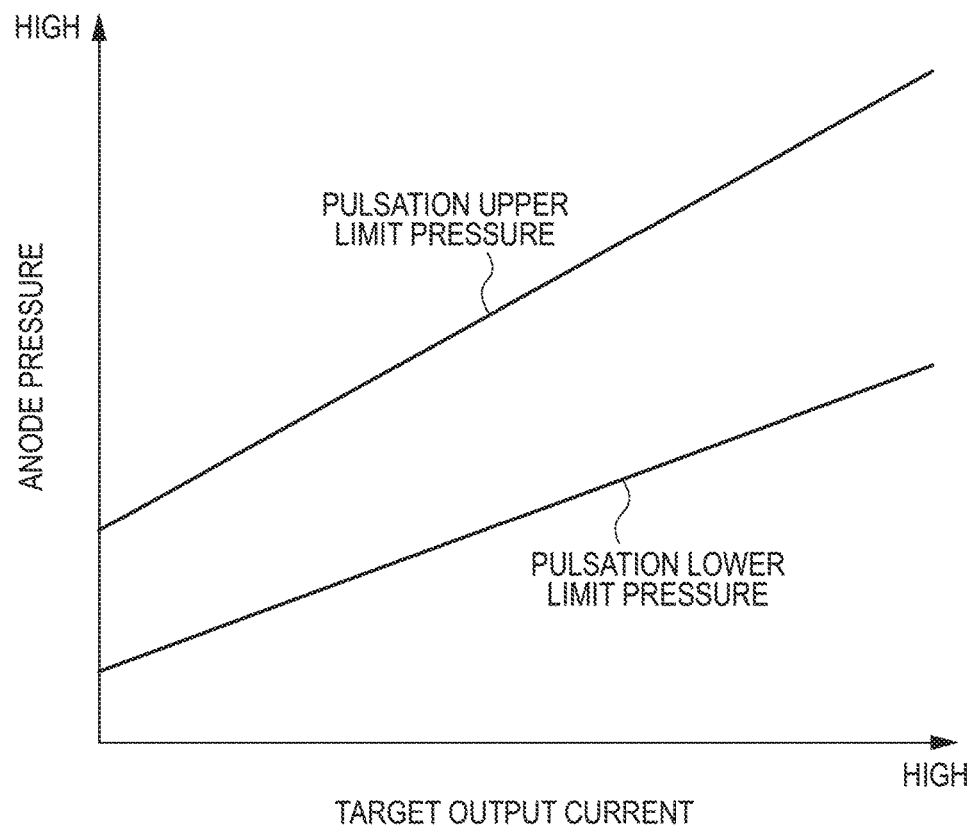
FIG. 10 is a table for computing pulsation upper/lower limit pressures based on a target output current.

In the step S 1, the controller 4 sets the pulsation upper limit pressure and the pulsation lower limit pressure of the anode pressure based on the target output current of the fuel cell stack 1 with reference to the table of FIG. 10.

In the step S2, the controller 4 determines whether or not the anode pressure is equal to or higher than the pulsation upper limit pressure. The controller 4 processes the step S3 in order to decrease the anode pressure if the anode pressure is equal to or higher than the pulsation upper limit pressure. Otherwise, if the anode pressure is lower than the pulsation upper limit pressure, the controller 4 processes the step S4.

In the step S3, the controller 4 sets the target anode pressure to the pulsation lower limit pressure.

In the step S4, the controller 4 determines whether or not the anode pressure is equal to or lower than the pulsation lower limit pressure. The controller 4 processes the step S5 in order to increase the anode pressure if the anode pressure is equal to or lower than the pulsation lower limit pressure. Otherwise, if the anode pressure is higher than the pulsation lower limit pressure, the controller 4 processes the step S6.

In the step S5, the controller 4 sets the target anode pressure to the pulsation upper limit pressure.

In the step S6, the controller 4 sets the target anode pressure to the same value as the previous one.

In the step S7, the controller 4 performs a feedback control for the hydrogen supply valve 33 such that the anode pressure becomes the pulsation lower limit pressure when the pulsation lower limit pressure is set as the target anode pressure. As a result of this feedback control, typically, an opening level of the hydrogen supply valve 33 is full closed, so that the supply of the anode gas from the high-pressure hydrogen tank 31 to the fuel cell stack 1 stops. As a result, the anode pressure decreases due to consumption of the anode gas and the like caused by generating electricity inside the fuel cell stack 1.

Meanwhile, the controller 4 performs a feedback control for the hydrogen supply valve 33 to increase the anode pressure to the pulsation upper limit pressure when the pulsation upper limit pressure is set as the target anode pressure. As a result of this feedback control, the hydrogen supply valve 33 is opened to a desired opening level, and the anode gas is supplied to the fuel cell stack 1 from the high-pressure hydrogen tank 31, so that the anode pressure increases.

Figure 11:
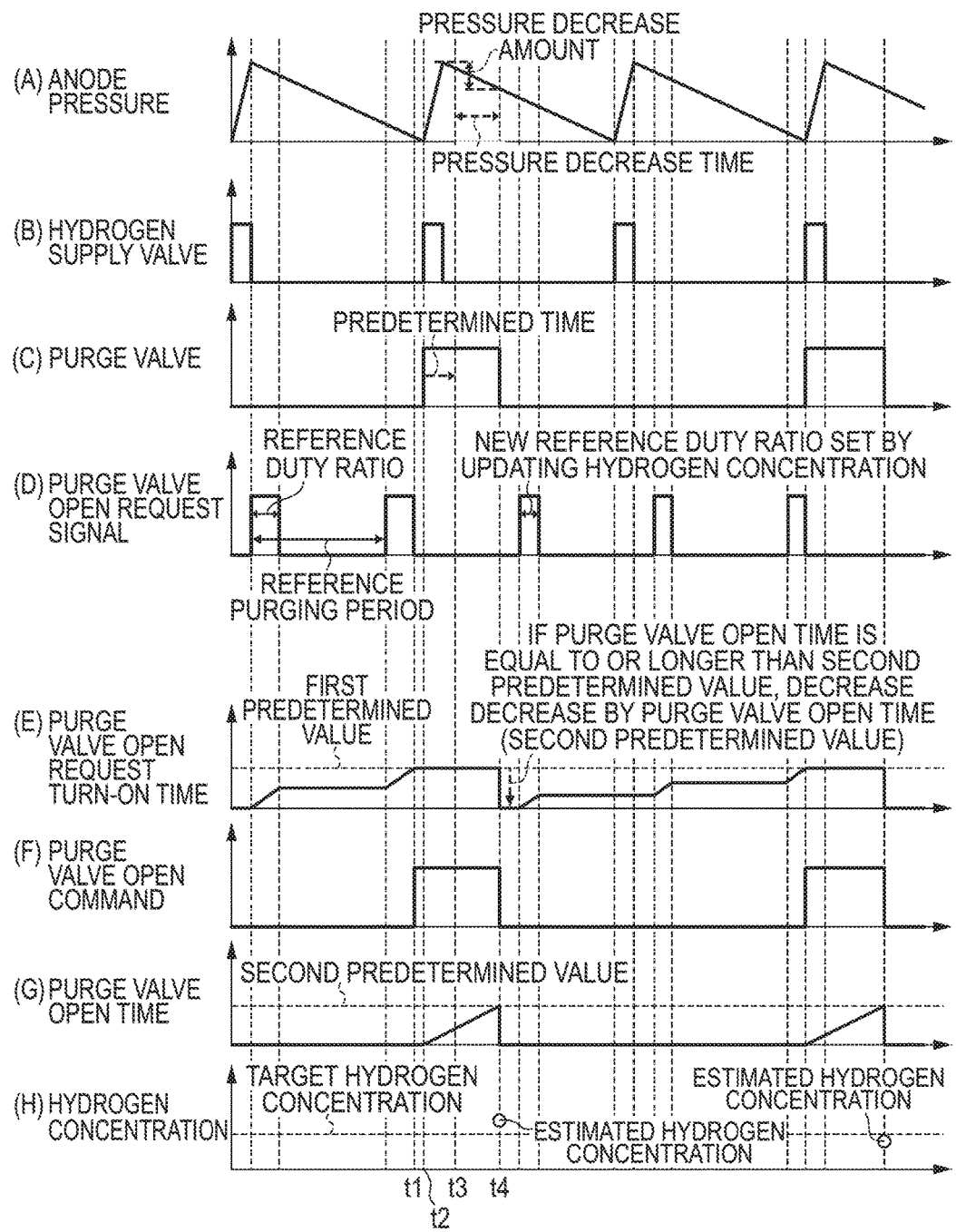
FIG. 11 is a timing chart illustrating a purge control operation according to the first embodiment of this invention.

FIG. 11 is a timing chart illustrating a purge control operation according to this embodiment.

As illustrated in FIG. 11D, a purge valve open request signal is generated such that the purge valve open request signal is turned on by a reference duty ratio during the reference purging period through the purge valve open request signal generation process. In addition, as illustrated in FIG. 11E, the purge valve open request turn-on time is computed by integrating the time for which the purge valve open request signal is turned on.

If the purge valve open request turn-on time is equal to or longer than a first predetermined value at the timing tl, the purge valve open command is turned on (FIG. 11F). Then, the purge valve 36 is also opened when the hydrogen supply valve 33 is opened at the timing t2 (FIG. 11C). As the purge valve 36 is opened, the purge valve open time is computed by integrating the time for which the purge valve 36 is opened as illustrated in FIG. 11G.

If the purge valve open time is equal to or longer than a predetermined time at the timing t3, and the hydrogen supply valve 33 is closed, the pressure decrease amount and the pressure decrease time of the anode pressure are computed from that timing.

If the purge valve open time is equal to or longer than a second predetermined time at the timing t4, the purge valve open command is turned off (FIG. 11F), and the purge valve 36 is closed (FIG. 11C). In addition, If the pressure decrease amount (or the pressure decrease time) is sufficient to estimate the hydrogen concentration at this timing, the hydrogen concentration is estimated (FIG. 11H).

In addition, as the hydrogen concentration is estimated newly, a new reference duty ratio is set based on the estimated hydrogen concentration (FIG. 11D). In this timing chart, since the estimated hydrogen concentration is higher than the target hydrogen concentration (FIG. 11H), the new reference duty ratio is lower than the previous reference duty ratio. In this manner, the valve open time (reference duty ratio) of the purge valve 36 changes depending on the hydrogen concentration. Specifically, the valve open time decreases as the hydrogen concentration increases, and the valve open time increases as the hydrogen concentration decreases. That is, the purging interval (interval until the purge valve open time reaches the first predetermined value) changes depending on the hydrogen concentration. Specifically, as the hydrogen concentration increases, the purging interval increases, frequency of the purging decreases, and the purging amount decreases. Meanwhile, as the hydrogen concentration decreases, the purging interval decreases, frequency of the purging increases, and the purging amount increases.

The fuel cell system 100 according to this embodiment described above comprises the hydrogen supply valve (supply valve) 33 for supplying the anode gas to the anode system of the fuel cell system 100, the purge valve 36 for discharging the anode off-gas (off-gas) from the anode system, the anode pressure sensor (pressure detecting portion) 34 that measures a pressure inside the anode system, and the controller 4 having the hydrogen concentration estimating portion that estimates the hydrogen concentration inside the anode system based on the pressure decrease during the purge valve 36 open duration in the hydrogen supply valve 33 close state.

The pressure decrease of the purge valve open duration in the hydrogen supply valve 33 close state is generated mainly by discharging the anode off-gas through the purge valve 36. In this case, as the hydrogen concentration inside the anode system increases, the average molecular weight of the anode off-gas decreases, the purge flow rate increases, and the pressure decrease amount of the anode pressure increases. Therefore, it is possible to estimate the hydrogen concentration inside the anode system with high accuracy by measuring the pressure decrease during the purge valve 36 open duration in the hydrogen supply valve 33 close state.

More specifically, the hydrogen concentration estimating portion of the fuel cell system 100 according to this embodiment estimates the hydrogen concentration inside the anode system based on the pressure decrease during the purge valve 36 open duration when a predetermined time elapses after the purge valve 36 is opened in the hydrogen supply valve 33 close state. Until the predetermined time elapses after the purge valve 36 is opened, the liquid water may be discharged instead of the anode off-gas from the purge valve 36. Therefore, the pressure decrease until a predetermined time elapses after the purge valve 36 is opened mainly depends on the hydrogen consumed for electricity generation. If the hydrogen concentration is estimated by measuring the pressure decrease for this duration, the estimation accuracy is degraded. In this regard, it is possible to suppress such degradation of the estimation accuracy by estimating the hydrogen concentration inside the anode system based on the pressure decrease of the purge valve 36 open duration when a predetermined time elapses after the purge valve 36 is opened.

In the fuel cell system 100 according to this embodiment, the purge valve 36 is opened before the hydrogen supply valve 33 is closed. That is, since the purge valve 36 is opened in the hydrogen supply valve 33 open state, it is possible to effectively extrude and discharge the liquid water inside the anode system from the anode system using the anode gas supplied to the anode system. Therefore, since it is possible to remove or reduce the amount of the liquid water discharged from the purge valve 36 in the hydrogen supply valve 33 close state, it is possible to suppress degradation of the estimation accuracy of the hydrogen concentration.

The fuel cell system 100 according to this embodiment comprises the controller 4 further having a purge valve control portion that controls the purge valve 36 based on the open/close state of the hydrogen supply valve 33 and the hydrogen concentration.

Since the purge valve control portion changes an interval for issuing the purge valve 36 open command based on the hydrogen concentration, so that the purge valve 36 is opened in the hydrogen supply valve 33 open state as the valve open command is issued, it is possible to effectively extrude and discharge the liquid water inside the anode system from the inside of the anode system using the anode gas supplied to the anode system. Therefore, since it is possible to remove or reduce the amount of liquid water discharged from the purge valve 36 in the hydrogen supply valve 33 close state, it is possible to suppress degradation of the estimation accuracy for the hydrogen concentration.

Since the purge valve control portion reduces the interval of issuing the purge valve 36 open command as the hydrogen concentration decreases, it is possible to suppress a decrease of the hydrogen concentration by increasing frequency of the purging when the hydrogen concentration is low.

The purge valve control portion increases the purging amount as the hydrogen concentration decreases by changing the purging amount of the anode off-gas discharged from the inside of the anode system through the purge valve 36 based on the hydrogen concentration. Therefore, it is possible to suppress a decrease of the hydrogen concentration.

The purge valve control portion increases the valve open time of the purge valve 36 as the hydrogen concentration decreases by changing the valve open time of the purge valve 36 based on the hydrogen concentration. Therefore, it is possible to suppress a decrease of the hydrogen concentration.

Second Embodiment

Next, a second embodiment of this invention will be described. This embodiment is different from the first embodiment in the method of estimating the hydrogen concentration. Hereinafter, a description will be made by focusing on this difference. It is noted that like reference numerals denote like elements for similar functional parts as in the first embodiment, and they will not be described repeatedly.

Figure 12:
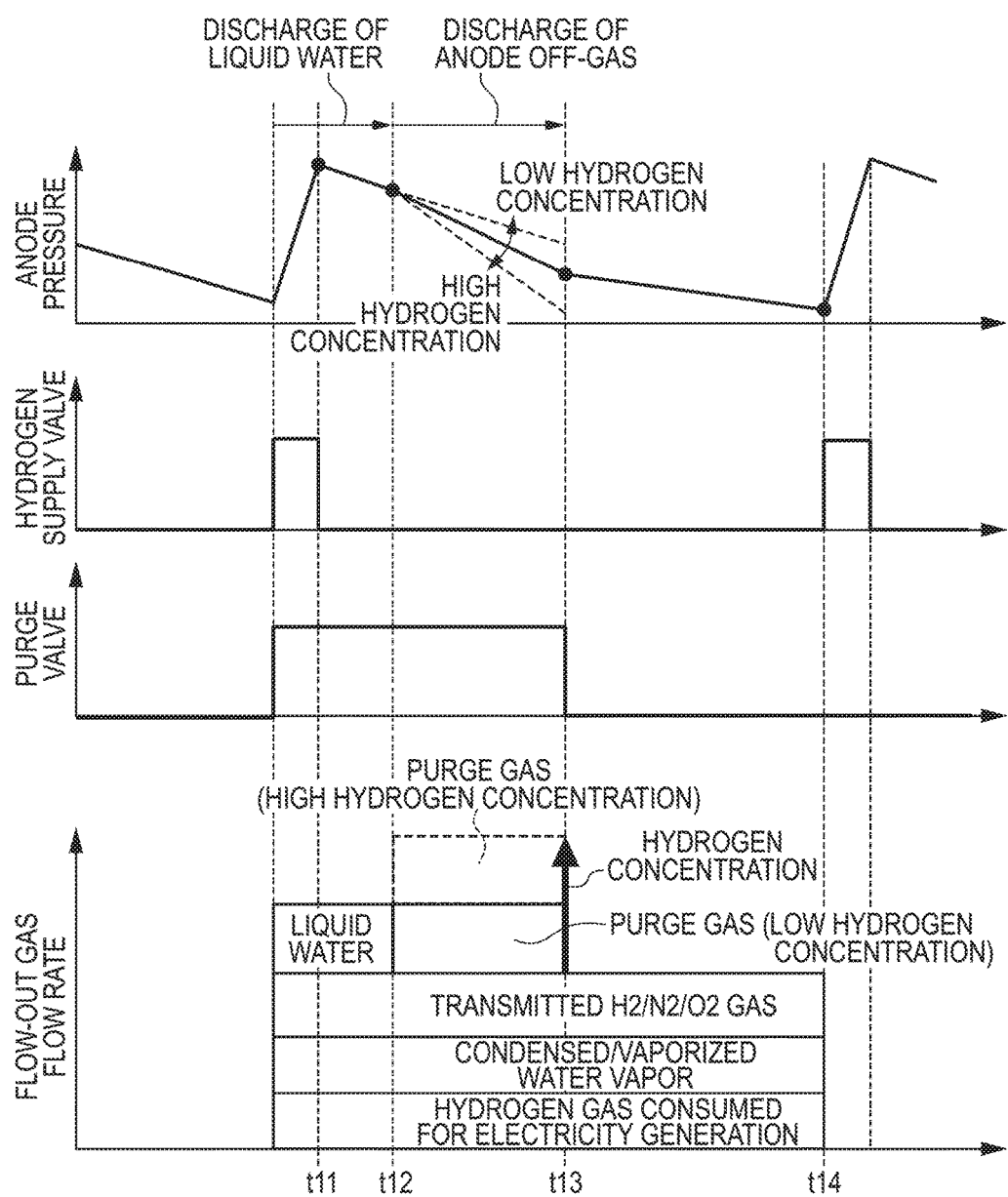
FIG. 12 is a diagram illustrating a hydrogen concentration estimation method according to a second embodiment of this invention.
Figure 13:
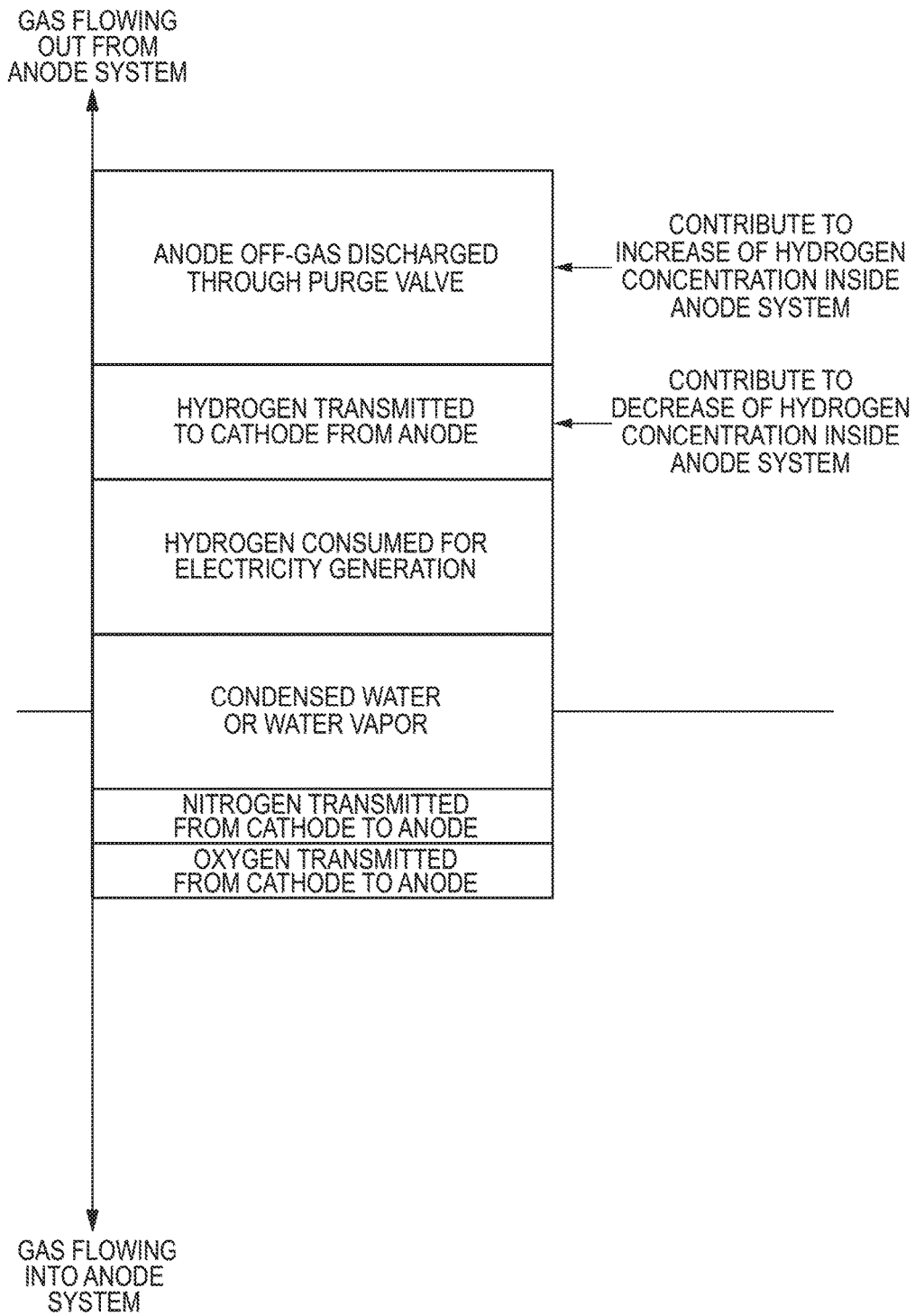
FIG. 13 is a diagram illustrating a gas input/output flow inside the anode system in the hydrogen supply valve close state.

FIG. 12 is a diagram illustrating a method of estimating the hydrogen concentration according to this embodiment. FIG. 13 is a diagram illustrating a gas input/output flow inside the anode system in the hydrogen supply valve 33 close state.

In the first embodiment, a factor of changing the anode pressure regardless of the open/close state of the purge valve 36 is only the hydrogen in the anode system consumed by generating electricity in the hydrogen supply valve 33 close state. However, in addition to the hydrogen consumed for electricity generation, there are other factors of changing the anode pressure regardless of the open/close state of the purge valve 36.

In addition to the hydrogen consumed for electricity generation, as a second factor, the anode pressure may change when the liquid water inside the anode system is vaporized to water vapor, or reversely, when water vapor is condensed to liquid water. The anode pressure changes depending on a balance between the vaporization and condensation. A third factor is hydrogen (transmitted hydrogen) transmitted from the anode side to the cathode side through the electrolytic membrane, or reversely, nitrogen and oxygen transmitted from the cathode side to the anode side through the electrolytic membrane. The anode pressure changes depending on the balance of these transmitted gases.

Therefore, the anode pressure decreases due to the three factors during the purge valve close duration from the timing t13 to the timing t14.

Meanwhile, since the purge valve 36 is opened from the timing t11 to the timing t13, the anode pressure decreases also by the gas (purge gas) flowing out through the purge valve 36 in addition to the three factors. As described above, due to the structure of the purge valve 36, as the purge valve 36 is opened, first, liquid water is discharged, and the anode off-gas is then discharged as the purge gas. Therefore, as illustrated in FIG. 12, the anode off-gas is discharged from the timing t12.

In this regard, according to this embodiment, a pressure decrease rate of the purge valve open duration (at the timing t12 to t13) in the hydrogen supply valve 33 close state after the discharge of liquid water is completed, and a pressure decrease rate of the purge valve close duration (at the timing t13 to t14) in the hydrogen supply valve close state are obtained.

Here, even during the purge valve open duration from the timing t12 to the timing t13, it is conceived that the pressure decrease rate generated by the three factors described above does not change.

Therefore, by subtracting the pressure decrease rate of the purge valve close duration (at the timing t13 to t14) in the hydrogen supply valve close state from the pressure decrease rate (average pressure decrease) of the purge valve open duration (at the timing t12 to t13) in the hydrogen supply valve close state after the discharge of the liquid water is completed, it is possible to compute the pressure decrease rate generated only by the gas (purge gas) flowing out through the purge valve 36 with high accuracy. Therefore, according to this embodiment, since it is possible to estimate the hydrogen concentration based on the pressure decrease rate generated only by the purge gas flowing out through the purge valve 36, it is possible to improve the estimation accuracy of the hydrogen concentration.

Figure 14:
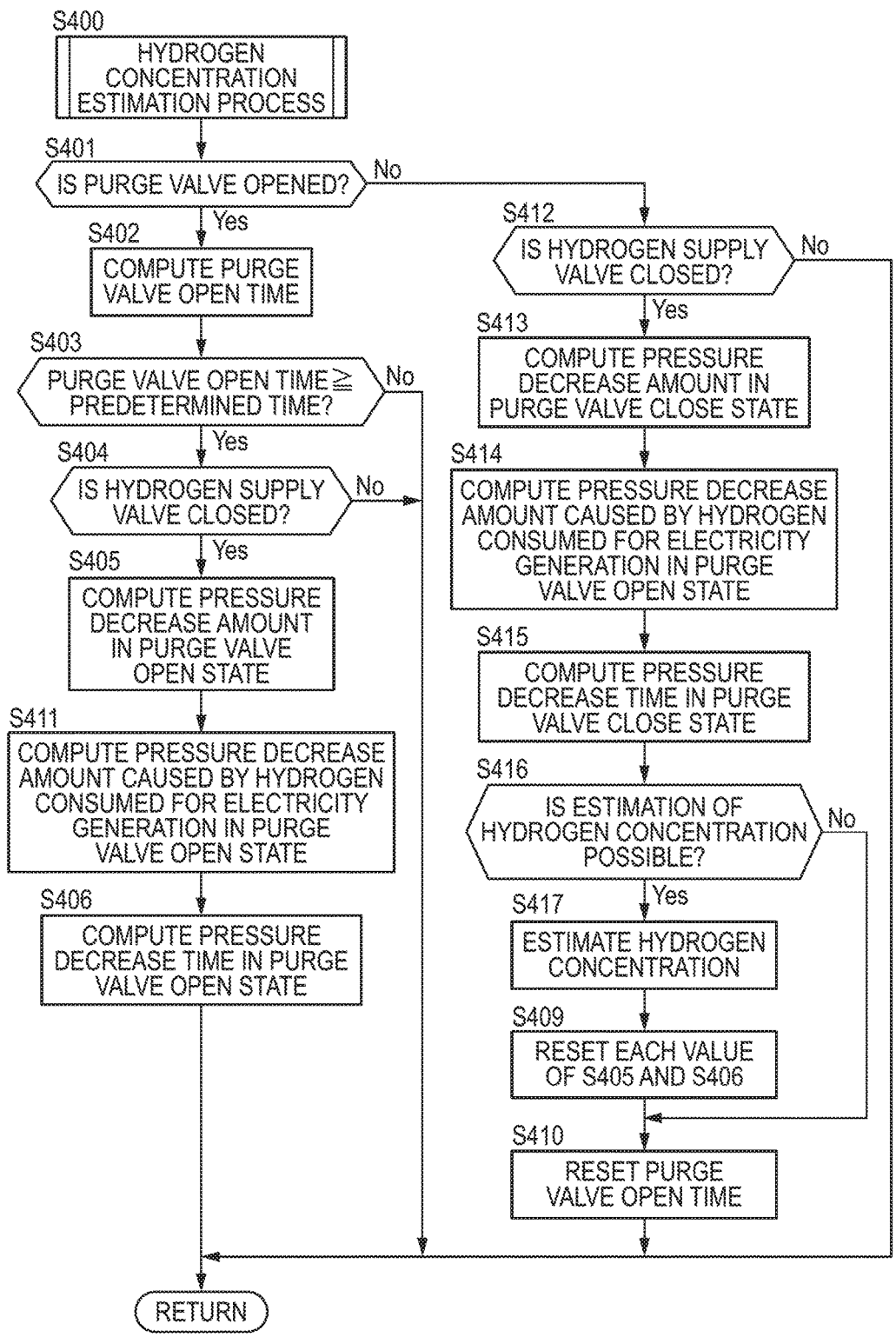
FIG. 14 is a flowchart illustrating a hydrogen concentration estimation process according to the second embodiment of this invention in detail.

FIG. 14 is a flowchart illustrating the hydrogen concentration estimation process according to this embodiment in detail.

The process until the step S410 is similar to that of the first embodiment. Therefore, a description hereinafter will be made only for the process subsequent to the step S411.

Figure 15:
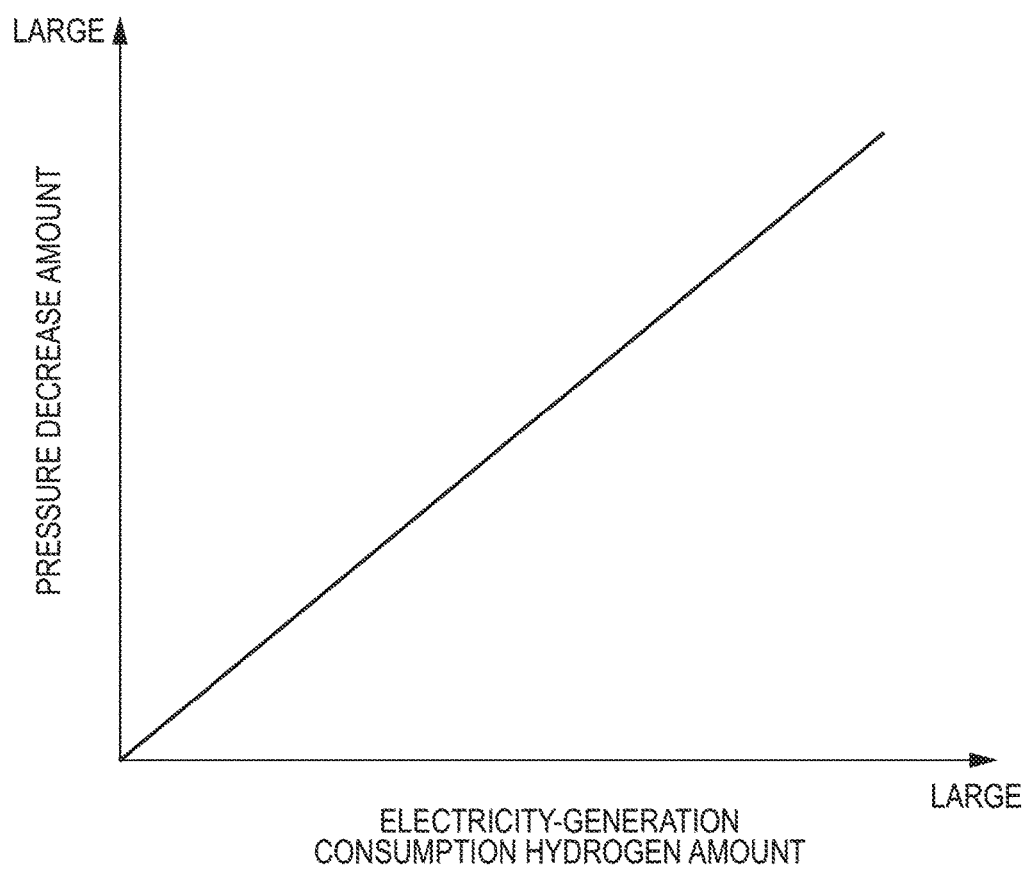
FIG. 15 is a table for computing a pressure decrease amount based on an electricity-generation consumption hydrogen amount.

In the step S411, the controller 4 computes the hydrogen amount per operation cycle consumed in the fuel cell stack 1 by generating electricity in the purge valve open state, based on the detection value (output current) of the electric current sensor 43. By adding this hydrogen amount to the previous one, the controller 4 computes the electricity-generation consumption hydrogen amount during the purge valve 36 open duration in the hydrogen supply valve 33 close state. In addition, the table of FIG. 15 is created in advance through experiments and the like by associating the electricity-generation consumption hydrogen amount and the pressure decrease amount, and the pressure decrease amount caused by the electricity-generation consumption hydrogen amount is computed by referencing this table.

Figure 16:
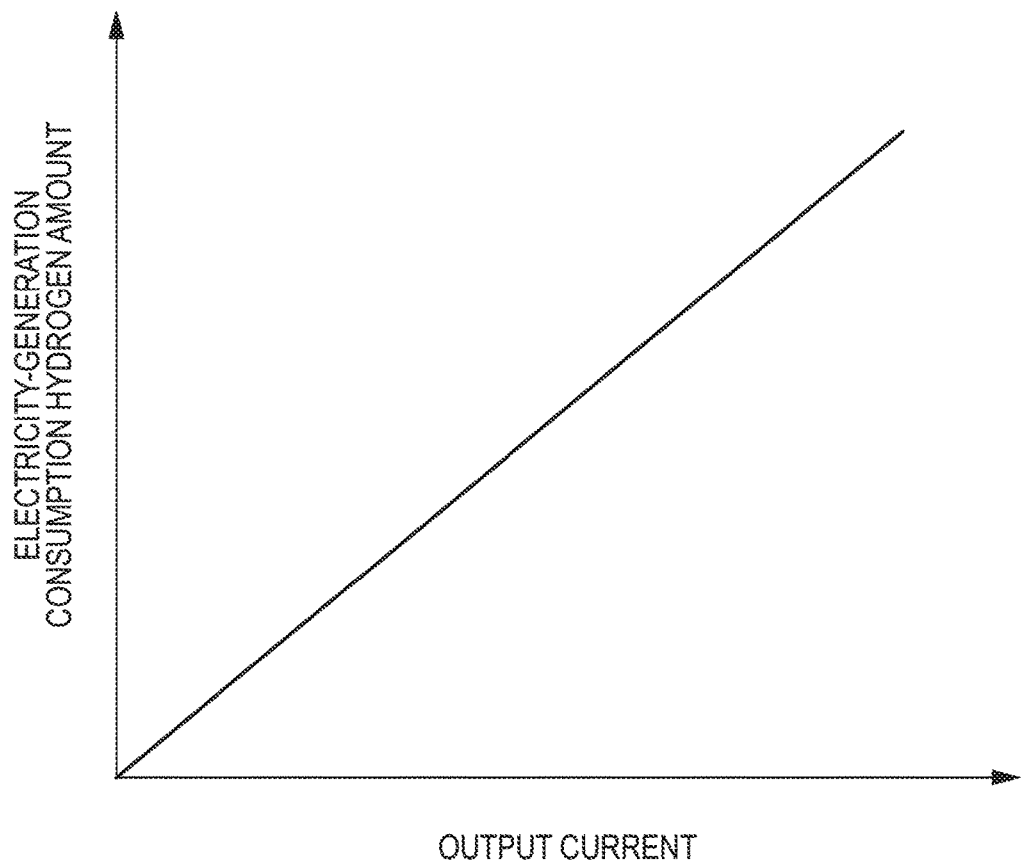
FIG. 16 is a table for computing a consumed hydrogen amount based on an output current.

The hydrogen amount per operation cycle consumed in the fuel cell stack 1 by generating electricity in the purge valve open duration may be computed, for example, based on the output current by creating, in advance, the table of FIG. 16 obtained by associating the output current and the consumed hydrogen amount through experiments and the like and referencing this table. In addition, it is also possible to obtain the hydrogen amount by, for example, computing a molar mass n of the consumed hydrogen may be computed by applying the output current i, the operation cycle At, and the number of fuel cells N to a Faraday constant(F)-based formula (n=N·i·Δt/2F).

In the step S412, the controller 4 determines whether or not the hydrogen supply valve is closed. The controller 4 processes the step S413 if the hydrogen supply valve is closed. If the hydrogen supply valve is opened, the controller 4 terminates the process.

In the step S413, the controller 4 computes the pressure decrease amount per operation cycle and adds this pressure decrease amount to the previous one, so as to compute the pressure decrease amount during the purge valve 36 close duration in the hydrogen supply valve 33 close state.

In the step S414, the controller 4 computes the hydrogen amount per operation cycle consumed in the fuel cell stack 1 by generating electricity in the purge valve close state, based on the detection value (output current) of the electric current sensor 43, and adds this hydrogen amount to the previous one, so as to compute the electricity-generation consumption hydrogen amount during the purge valve 36 close duration in the hydrogen supply valve 33 close state. In addition, the controller 4 computes the pressure decrease amount caused by the electricity-generation consumption hydrogen amount by referencing the table of FIG. 15.

In the step S415, the controller 4 computes the time necessary in the pressure decrease corresponding to the pressure decrease amount computed in the step S413 (pressure decrease time in the purge valve close state).

In the step S416, the controller determines whether or not the hydrogen concentration can be estimated with high accuracy. Specifically, it is determined whether or not each of the pressure decrease amounts computed in the steps S405 and S412 is equal to or larger than a predetermined value, or whether or not each of the pressure decrease times computed in the steps S406 and S413 is equal to or longer than a predetermined value. The controller 4 processes the step S417 if it is determined that the hydrogen concentration can be estimated with high accuracy. Otherwise, the controller 4 terminates the process.

Figure 17:
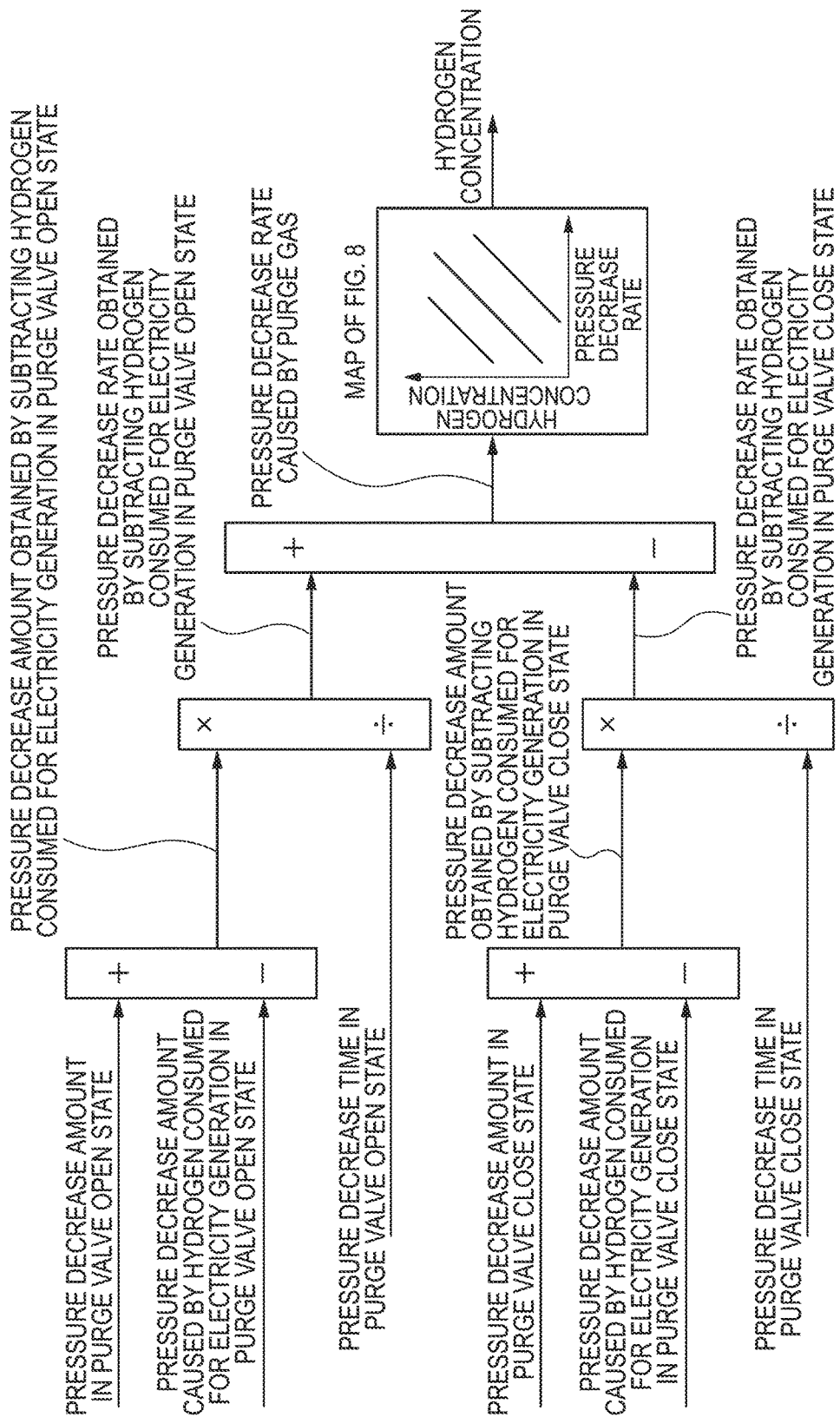
FIG. 17 is a block diagram illustrating a hydrogen concentration estimation method according to the second embodiment of this invention.

In the step S417, the controller 4 estimates the hydrogen concentration by performing the computation of FIG. 17. As a method of estimating the hydrogen concentration, a value obtained by subtracting the pressure decrease rate of the purge valve close duration from the pressure decrease rate of the purge valve open duration may be set to the pressure decrease rate caused by the purge gas as described above with reference to FIG. 12. However, by subtracting the pressure decrease rate caused by the hydrogen consumed for electricity generation from the pressure decrease rate of the purge valve open duration and the pressure decrease rate of the purge valve close duration in advance as illustrated in FIG. 17, it is possible to more improve the estimation accuracy of the hydrogen concentration. This is because the electricity-generation consumption hydrogen amount changes depending on a load change, and it is difficult to say that the electricity-generation consumption hydrogen amount is necessarily constant while the purge valve 36 is opened or closed.

The hydrogen concentration estimating portion of the fuel cell system 100 according to this embodiment described above estimates the hydrogen concentration inside the anode system based on each of the pressure decreases during the valve open duration and the purge valve 36 close duration in the hydrogen supply valve 33 close state. For this reason, it is possible to measure only the pressure decrease caused by the anode off-gas discharged through the purge valve 36 with high accuracy. Therefore, it is possible to estimate the hydrogen concentration with high accuracy.

Although the detection value of the anode pressure sensor 34 is used as the pressure inside the anode system in the aforementioned embodiments, the pressure inside the anode system may be estimated, for example, from the opening level of the hydrogen supply valve 33 and the like.

Although the pulsating operation for pulsating the anode pressure is performed in the aforementioned embodiment, the fuel cell system may constantly maintain the anode pressure depending on the load of the fuel cell stack. In this case, the purge valve 36 may be opened/ closed during a transient time for decreasing the load (anode decrease time) to estimate the hydrogen concentration. In addition, the anode pressure may be pulsated primarily in order to estimate the hydrogen concentration.

Although the purge valve 36 is opened in synchronization with the hydrogen supply valve 33 open operation in the aforementioned embodiment, it is not necessary to synchronously perform such an operation.

In the aforementioned embodiment, the anode gas discharge passage 35 in the upstream from the purge valve 36 may be connected to the anode gas supply passage 32 to circulate the anode off-gas.

Although embodiments of this invention have been described hereinbefore, the aforementioned embodiments are just for illustrative purposes, and they are not intended to limit the spirit and scope of this invention to the specific configurations.

The present application claims a priority of Japanese Patent Application No. 2014-219710 filed with the Japan Patent Office on Oct. 28, 2014, all the contents of which are hereby incorporated by reference.

The invention claimed is:

1. A fuel cell system having a fuel cell supplied with an anode gas and a cathode gas to generate electricity from the fuel cell depending on a load, comprising:
   a supply valve for supplying the anode gas into an anode system of the fuel cell system;
   a purge valve for discharging an off-gas from the anode system;
   a pressure detecting portion that estimates or measures a pressure inside the anode system; and
   a hydrogen concentration estimating portion that estimates the hydrogen concentration inside the anode system based on a pressure decrease during a purge valve open duration when a predetermined time elapses after the purge valve is opened in a supply valve close state.

2. The fuel cell system according to claim 1, wherein the purge valve is opened before the supply valve is closed.

3. The fuel cell system according to claim 1, further comprising a purge valve control portion that controls the purge valve based on an open/close state of the supply valve and the hydrogen concentration.

4. The fuel cell system according to claim 3, wherein the purge valve control portion changes an interval of issuing a purge valve open command based on the hydrogen concentration and opens the purge valve in the supply valve open state, and the valve open command is issued.

5. The fuel cell system according to claim 4, wherein the purge valve control portion reduces the interval of issuing a purge valve open command as the hydrogen concentration decreases.

6. The fuel cell system according to claim 3, wherein the purge valve control portion changes the purging amount of the off-gas discharged from the anode system through the purge valve based on the hydrogen concentration.

7. The fuel cell system according to claim 6, wherein the purge valve control portion increases the purging amount as the hydrogen concentration decreases.

8. The fuel cell system according to claim 6, wherein the purge valve control portion increases the valve open time of the purge valve as the hydrogen concentration decreases.

9. The fuel cell system according to claim 3, wherein the purge valve control portion changes the valve open time of the purge valve based on the hydrogen concentration.

10. A fuel cell system having a fuel cell supplied with an anode gas and a cathode gas to generate electricity from the fuel cell depending on a load, comprising:
   a supply valve for supplying the anode gas into an anode system of the fuel cell system;
   a purge valve for discharging an off-gas from the anode system;
   a pressure detecting portion that estimates or measures a pressure inside the anode system; and
   a hydrogen concentration estimating portion that
   estimates the hydrogen concentration inside the anode system based on each of a pressure decrease during a purge valve open duration and a pressure decrease during a purge valve close duration in a supply valve close state.

11. A method of fuel cell system, the fuel cell system comprising:
   a fuel cell supplied with an anode gas and a cathode gas to generate electricity from the fuel cell depending on a load;
   a supply valve for supplying the anode gas into an anode system of the fuel cell system; and
   a purge valve for discharging an off-gas from the anode system;
   a pressure detecting portion that estimates or measures a pressure inside the anode system,
   the method comprising estimating a hydrogen concentration inside the anode system based on a pressure decrease during a purge valve open duration when a predetermined time elapses after the purge valve is opened in a supply valve close state.

* * * * *